US010850846B2

(12) United States Patent
Fullerton et al.

(10) Patent No.: US 10,850,846 B2
(45) Date of Patent: Dec. 1, 2020

(54) FOOT WASHING SYSTEMS AND METHODS

(71) Applicant: THE BOEING COMPANY, Chicago, IL (US)

(72) Inventors: James A. Fullerton, Bothell, WA (US); Douglas Alan Brown, Edmonds, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/792,857

(22) Filed: Oct. 25, 2017

(65) Prior Publication Data

US 2019/0118948 A1  Apr. 25, 2019

(51) Int. Cl.
| B64D 11/02 | (2006.01) |
| A47K 17/02 | (2006.01) |
| A47K 3/022 | (2006.01) |
| E03C 1/324 | (2006.01) |

(52) U.S. Cl.
CPC ............. *B64D 11/02* (2013.01); *A47K 3/022* (2013.01); *A47K 17/02* (2013.01); *E03C 1/324* (2013.01); *A47K 2201/02* (2013.01)

(58) Field of Classification Search
CPC ........ B64D 11/02; A47K 3/022; A47K 3/024; A47K 3/062; A47K 3/064; A47K 3/07; A47K 3/074; A47K 1/04; E03C 1/0404; E03C 2001/0417; E03C 2201/90
USPC ........................................................... 4/666
See application file for complete search history.

(56) References Cited

U.S. PATENT DOCUMENTS

| 1,289,225 | A | * | 12/1918 | Montan | A47K 1/02 296/37.1 |
| 3,094,711 | A | * | 6/1963 | Kentes | A47K 3/064 4/550 |
| 4,089,073 | A | | 5/1978 | Campbell | |
| 4,970,732 | A | | 11/1990 | Deng | |
| 5,067,186 | A | * | 11/1991 | Ayers | A47D 5/003 4/420.3 |
| 5,636,391 | A | * | 6/1997 | Greene, III | A47K 3/034 4/420.3 |
| 6,604,471 | B1 | | 8/2003 | Tarver | |
| 7,305,724 | B2 | * | 12/2007 | Rozental | A47K 3/074 4/572.1 |
| 7,984,520 | B2 | * | 7/2011 | Hall | A47K 4/00 4/663 |

(Continued)

FOREIGN PATENT DOCUMENTS

| CN | 2414713 | 1/2001 |
| CN | 200987633 | 12/2007 |

(Continued)

OTHER PUBLICATIONS

Extended European Search Report for EP 18201692.3-1002, dated Feb. 25, 2019.

*Primary Examiner* — Lori L Baker
(74) *Attorney, Agent, or Firm* — The Small Patent Law Group LLC; Joseph M. Butscher (57) ABSTRACT

A foot washing system includes a support panel, and a basin including a foot-washing area and a drain that is configured to drain water out of the foot-washing area. The basin is moveably coupled to the support panel. The basin is selectively moveable between a stowed position and a deployed position in relation to the support panel. The deployed position allows for foot washing within the foot-washing area.

22 Claims, 7 Drawing Sheets

(56) References Cited

U.S. PATENT DOCUMENTS

2016/0096624 A1   4/2016   McIntosh

FOREIGN PATENT DOCUMENTS

| | | |
|---|---|---|
| EP | 3002217 | 4/2016 |
| JP | H0593443 | 12/1993 |
| WO | WO 2018/084693 | 5/2018 |

* cited by examiner

FOOT WASHING SYSTEMS AND METHODS

FIELD OF EMBODIMENTS OF THE DISCLOSURE

Examples of the present disclosure generally relate to foot washing systems and methods, which may be used in confined spaces, such as lavatories of commercial aircraft.

BACKGROUND OF THE DISCLOSURE

Commercial aircraft typically include one or more lavatories within an interior cabin. A lavatory within an aircraft generally includes a toilet, a sink, and a faucet. The sink is positioned at a height that allows individuals to wash their hands.

For various cultural, religious, traditional and/or other such reasons, certain individuals may desire (and/or be required by conscience) to wash their feet, such as during a flight. For example, for religious purposes, an individual may wash feet before praying. One or more prayer times may occur during a particular flight, especially during long haul flights (such as transoceanic flights). Accordingly, certain individuals may find it necessary to use aircraft lavatories to wash their feet during flights before praying.

In order to wash feet within a lavatory of an aircraft, the individuals may place one foot at a time within a sink. As can be appreciated, a sink that is configured for hand washing is generally not amenable to foot washing. That is, individuals may find it awkward, cumbersome, difficult, and otherwise undesirable to position their feet within a sink of a lavatory of an aircraft. Moreover, water may splash over and/or drip from the sink onto the floor of the lavatory when an individual washes a foot within a sink.

SUMMARY OF THE DISCLOSURE

A need exists for systems and methods that allow individuals within a confined space to wash their feet. Further, a need exists for safe and efficient foot washing systems and methods, particularly within lavatories of commercial aircraft.

With those needs in mind, certain embodiments of the present disclosure provide a foot washing system that includes a support panel, and a basin including a foot-washing area and a drain that is configured to drain water out of the foot-washing area. The basin is moveably coupled to the support panel. The basin is selectively moveable between a stowed position and a deployed position in relation to the support panel. The deployed position allows for foot washing within the foot-washing area. The basin may be pivotally coupled to the support panel.

In at least one embodiment, a base of the basin in the stowed position is parallel with an outer lateral surface of the support panel. The base of the basin in the deployed position is perpendicular to the outer lateral surface of the support panel.

The foot washing system may also include a securing handle that securely retains the basin in the stowed position. The securing handle is configured to be engaged to release the basin from the stowed position. The foot washing system may also include a faucet that is configured to deliver water into the foot-washing area of the basin in the deployed position.

In at least one embodiment, the drain of the basin in the deployed position is configured to be positioned directly over a bowl of a toilet. The basin is positioned away from the toilet in the stowed position. The basin in the deployed position may be configured to be directly supported by the bowl of the toilet.

The support panel may include a graspable top support handle that is configured to be grasped by an individual for support and stability.

The basin may also include a drain cover that is configured to cover the drain when the basin is in the stowed position. The basin may also include at least one additional drain. The additional drain(s) is configured to drain residual water in the basin as the basin is moved from the deployed position into the stowed position.

In at least one embodiment, the support panel is configured to be secured to a wall of a lavatory.

Certain embodiments of the present disclosure provide a foot washing method that includes moveably coupling a basin including a foot-washing area and a drain that is configured to drain water out of the foot-washing area to a support panel, and selectively moving the basin between a stowed position and a deployed position in relation to the support panel. The deployed position allows for foot washing within the foot-washing area.

Certain embodiments of the present disclosure provide a vehicle that includes an internal cabin, a lavatory within the internal cabin (in which the lavatory includes a toilet having a bowl), and a foot washing system within the lavatory.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Examples of the present disclosure provide a foot washing system that is configured for use within an enclosed space, such as a lavatory of a commercial aircraft. The foot washing system includes a basin that couples to a support panel. The basin is configured to be moved in relation to the support between a stowed position and a deployed position. In the deployed position, the basin is at a height that allows an individual to easily position a foot therein. A faucet is used to deliver water into the basin in order to wash a foot positioned therein. The basin includes a drain that allows the water to be drained to a waste water container, such as a toilet bowl within the lavatory. For example, in the deployed position, the basin may be positioned directly over a bowl of a toilet. In this manner, the drain allows water within the basin to drain directly into the bowl of the toilet. After use, an individual pivots the basin back into the stowed position. In the stowed position, the basin is folded into the support panel against a wall within the enclosed space.

Figure 1:
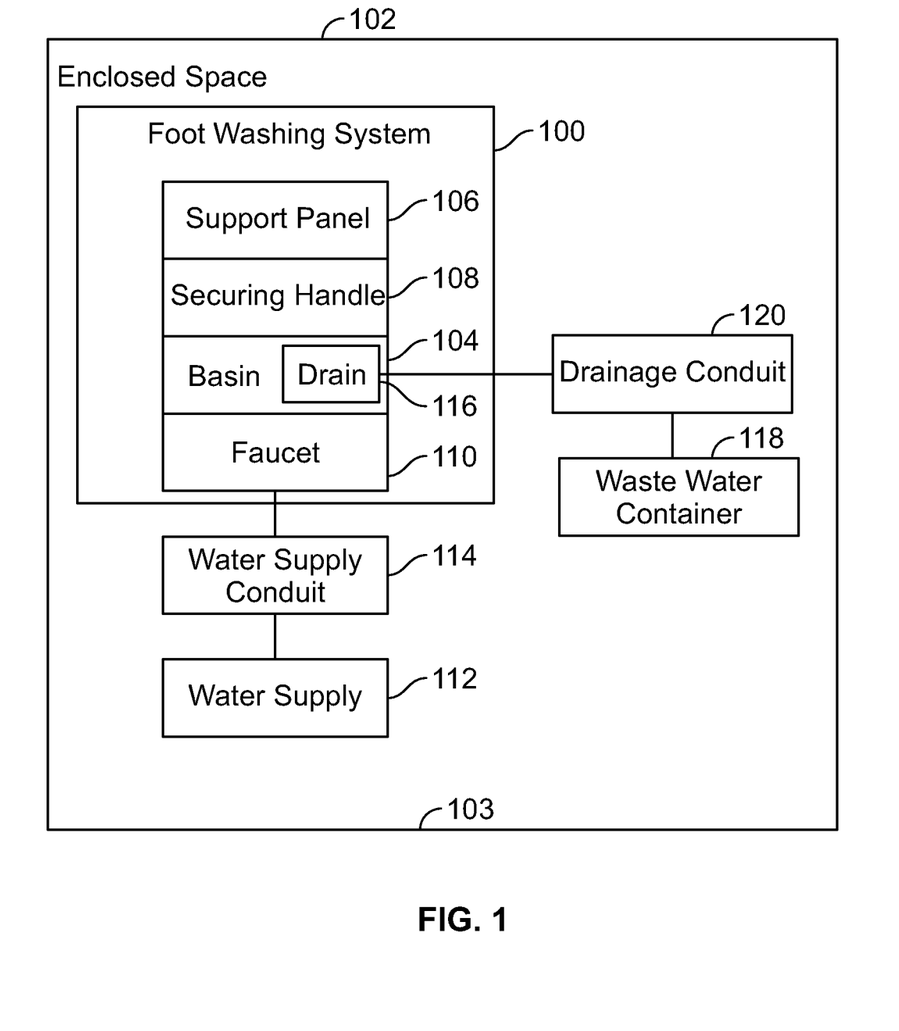
FIG. 1 illustrates a schematic block diagram of a foot washing system within an enclosed space, according to an example of the present disclosure.

FIG. 1 illustrates a schematic block diagram of a foot washing system 100 within an enclosed space 102, according to an example of the present disclosure. In at least one embodiment, the enclosed space 102 is a lavatory within a vehicle, such as a commercial aircraft. Alternatively, the enclosed space 102 may be within residential or commercial buildings. For example, the enclosed space 102 may be within a lavatory of an office building. In at least one other embodiment, the enclosed space 102 may be any room within a structure or vehicle. In at least one other embodiment, the foot washing system 100 may be located outside of an enclosed space, such as on an outside portion of a structure.

The foot washing system 100 includes a basin 104 that is moveably secured to a support panel 106. For example, the basin 104 may be pivotally coupled to the support panel 106. The basin 104 is configured to be selectively moved relative to the support panel 106 between a stowed position and a deployed position. In the stowed position, a surface of a base of the basin 104 may be parallel with an outer lateral surface of the support panel 106. In at least one embodiment, the basin 104 is upright or otherwise vertically-oriented in relation to a floor 103 of the enclosed space 102. In the deployed position, the surface of the base of the basin 104 may be perpendicular to the outer lateral surface of the support panel 106. In the deployed position, the basin 104 is configured to allow an individual to position a foot therein for washing. In at least one embodiment, the basin 104 in the deployed position is horizontally-oriented in relation to a floor 103 of the enclosed space 102.

A securing handle 108 is configured to securely retain the basin 104 in the stowed position. An individual may engage the securing handle 108 to release the basin 104 from the stowed position and move the basin 104 into the deployed position.

The foot washing system 100 also includes a faucet 110 that allows water to be delivered into the basin 104 in the deployed position. The faucet 110 is connected to a water supply 112 via a water supply conduit 114 (for example, plumbing such as one or more pipe(s), tube(s), hose(s), and/or the like). For example, the faucet 110 may be connected to the water supply 112 for a hand-washing faucet, a toilet, or the like within a lavatory.

The basin 104 includes a drain 116 that allows water within the basin 104 to drain to a waste water container 118. In at least one embodiment, the waste water container 118 is a bowl of a toilet within a lavatory. In the deployed position, the drain 116 of the basin 104 is positioned directly over the waste water container 118, such as the bowl of the toilet. In this manner, water within the basin 104 is able to drain directly into the bowl of the toilet via the drain 116. An air gap may be defined between the waste water container 118 and the basin 194. The air gap prevents or otherwise reduces cross contamination between water within the waste container (for example, "black water") and the water within the basin 104 (for example, "gray water"). In at least one other embodiment, the waste water container 118 may be a tank within a vehicle that is configured to retain waste water. In this embodiment, the drain 116 may fluidly connect to the waste water container 118 through a drainage conduit 120 (for example, plumbing such as one or more pipe(s), tube(s), hose(s), and/or the like). Alternatively, the drain 116 may not connect to a distinct waste water container 118, but may fluidly connect to another drainage system (such as a sewer) or an outside environment.

In operation, an individual desiring to wash one or both feet engages the securing handle 108 to move the basin 104 into the deployed position. The individual then places a foot into the basin 104 and operates the faucet 110 to deliver water into the basin 104 to wash the foot. After the foot washing process is completed, the individual moves the basin 104 back into the stowed position, such that the securing handle 108 securely retains (such as by latching, clasping, or the like) the basin 104 in the stowed position.

Figure 2:
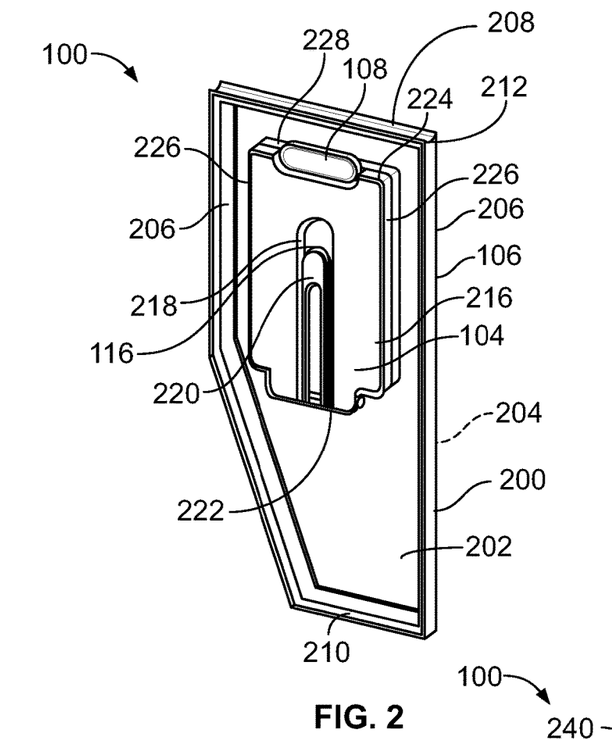
FIG. 2 illustrates a perspective front view of a foot washing system including a basin in a stowed position, according to an example of the present disclosure.
Figure 3:
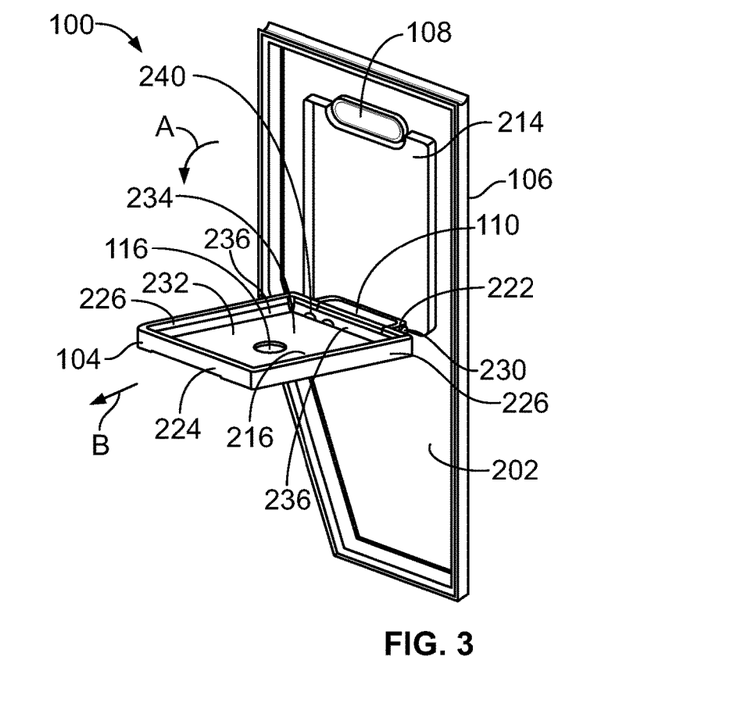
FIG. 3 illustrates a perspective front view of the foot washing system of FIG. 2 in which the basin is in a deployed position.

FIG. 2 illustrates a perspective front view of the foot washing system 100 including the basin 104 in a stowed position, according to an example of the present disclosure. FIG. 3 illustrates a perspective front view of the foot washing system 100 in which the basin 104 is in a deployed position. Referring to FIGS. 2 and 3, the support panel 106 includes a main body 200 that includes a front surface 202 opposite a rear surface 204, which are bounded by side walls 206 that connect to a top support handle 208 and a lower wall 210. The top support handle 208 includes a channel 212 that allows an individual to grasp the top support handle 208 for support. In at least one other embodiment, the top support handle 208 may include a bar (not shown) that is configured to be grasped by an individual. Optionally, the support panel 106 may not include a top support handle 208, but may instead include a top wall, similar to the lateral walls 206 and the lower wall 210. In at least one embodiment, the support panel 106 is configured to mount to an interior wall of a lavatory. The support panel 106 may be sized and shaped differently than shown. For example, the support panel 106 may be rectangular, circular, triangular, or the like.

A basin-retaining cavity 214 is defined within the front surface 202 of the support panel 106. The basin-retaining cavity 214 is sized and shaped to retain the basin 104 in the stowed position.

The basin 104 includes a lower base 216 that may be flush or otherwise parallel with the front surface 202 of the support panel 106 in the stowed position. A recessed track 218 may be formed in the base 216. A drain cover 220 is moveably secured within the recessed track 218. As shown in FIG. 2, the drain cover 220 covers the drain 116 (hidden from view in FIG. 2) in the stowed position.

The basin 104 further includes a proximal end wall 222 that connects to a distal end wall 224 through the base 216 and lateral walls 226. The proximal end wall 222 is pivotally coupled to the support panel 106 through one or more pivot pins, hinges, or the like. The distal end wall 224 includes a recessed edge 228 that is latchably engaged by the securing handle 108 in the stowed position. For example, the securing handle 108 may latch onto the recessed edge 228 to retain the basin 104 in the stowed position. The securing handle 108 may be configured to be depressed in order to release the basin 104 from the stowed position. Optionally, instead of a separate and distinct handle 108, the basin 104 may include a handle, lip, or the like at the distal end wall 224 that is configured to be grasped by an individual to move the basin 104 between the stowed position and the deployed position.

In order to move the basin 104 into the deployed position from the stowed position, the securing handle 108 is engaged to release the basin 104 from a secure connection with the securing handle 108. The distal end wall 224 may then be grasped so that the basin 104 may be pivoted downward in the direction of arc A about a pivot axle 230 defined between the proximal end wall 222 and the support panel 106.

As shown in FIG. 3, the basin 104 includes a foot-washing area 232 defined by an upper surface 234 of the base 216 and interior surfaces 236 of the proximal end wall 222, the distal end wall 224, and the lateral walls 226. As shown, in the deployed position, the upper surface 234 of the base 216 may be perpendicular to front surface 202 of the support panel 106. Further, in the deployed position, the upper surface 234 of the base 216 may be parallel with and horizontal in relation to a floor of an enclosed space, such as a lavatory.

In the deployed position, the drain 116 is open. In at least one embodiment, as the basin 104 is downwardly pivoted into the deployed position, the drain cover 220 moves relative to the track 218 so that the drain cover 220 no longer covers the drain 116. In at least one embodiment, after the basin 104 is pivoted down into the deployed position, the basin 104 may be outwardly urged in the direction of arrow B to move the drain cover 220 relative to the track 218. For example, the basin 104 may include an articulated and/or extendable portion that allows the drain cover 220 to be moved relative to the track 218. Optionally, the basin 104 may be spring-biased towards the deployed position. The securing handle 108 overcomes the force of the spring-bias to maintain the basin 104 in the stowed position, as shown in FIG. 2. Alternatively, the basin 104 may not include the drain cover 220 and/or the track 218.

In the deployed position, the faucet 110 may be engaged, such as through one or more valve handles, a press actuation, and/or the like, to deliver water into the foot-washing area 232. The faucet 110 may later be engaged to stop the delivery of water into the foot-washing area 232. As the basin 104 is pivoted back into the stowed position (shown in FIG. 2), residual water within the foot-washing area 232 may be drained to the waste water container 118 via the drainage conduit 120 (shown in FIG. 1). For example, one or more drains 240 may be formed within the foot-washing area 232 proximate to the proximal end wall 222 into which residual water passes via gravity as the basin 104 is upwardly pivoted into the stowed position. The drain 116 and the drains 240 may be fluidly connected to the drainage conduit 120 (shown in FIG. 1). Optionally, the basin 104 may not include the drains 240.

Figure 4:
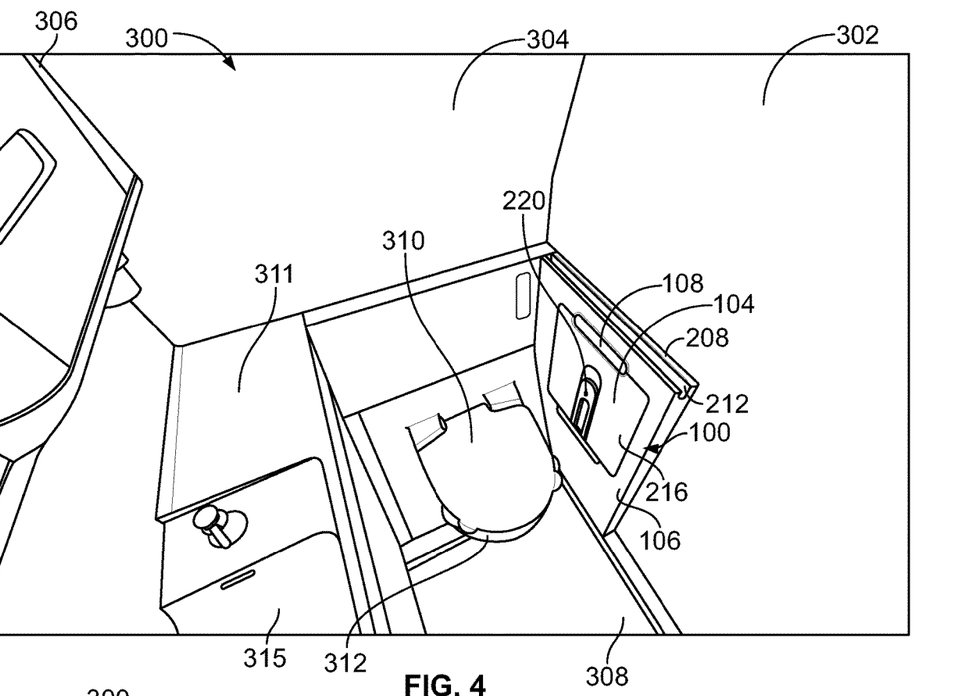
FIG. 4 illustrates a perspective interior view of a lavatory including a foot washing system having a basin in a stowed position, according to an example of the present disclosure.

FIG. 4 illustrates a perspective interior view of a lavatory 300 including the foot washing system 100 having the basin 104 in a stowed position, according to an example of the present disclosure. The lavatory 300 is an example of the enclosed space 102 shown in FIG. 1.

The lavatory 300 includes a lateral wall 302 connected to a rear wall 304, an opposite lateral wall 306, and a floor 308. A toilet 310 is supported on the rear wall 304 over the floor 308. A sink 315 extends from the lateral wall 306 and is recessed within a countertop 311. The foot washing system 100 is mounted to the lateral wall 302. The support panel 106 outwardly extends from the lateral wall 306, thereby exposing the top support handle 208, which an individual may grasp for support. The foot washing system 100 may be mounted to the lateral wall 302 through fasteners, adhesives, and/or the like. Optionally, the foot washing system 100 may be integrally formed with the lateral wall 302, instead of being separately mounted thereto. In at least one embodiment, the foot washing system 100 may be set into the lateral wall 302, instead of outwardly-extending therefrom.

As shown, the foot washing system 100 may be positioned within the lavatory 300 so that the basin 104 is laterally aligned with the toilet 310. In particular, in the deployed position, the drain 116 (shown in FIGS. 1-3) of the basin 104 may be positioned directly over a bowl 312 of the toilet 310. In the stowed position, as shown in FIG. 4, the basin 104 is held by the securing handle 108 in a vertical or otherwise upright position so that the basin 104 is generally parallel with the lateral wall 302 and does not extend over the toilet 310.

Figure 5:
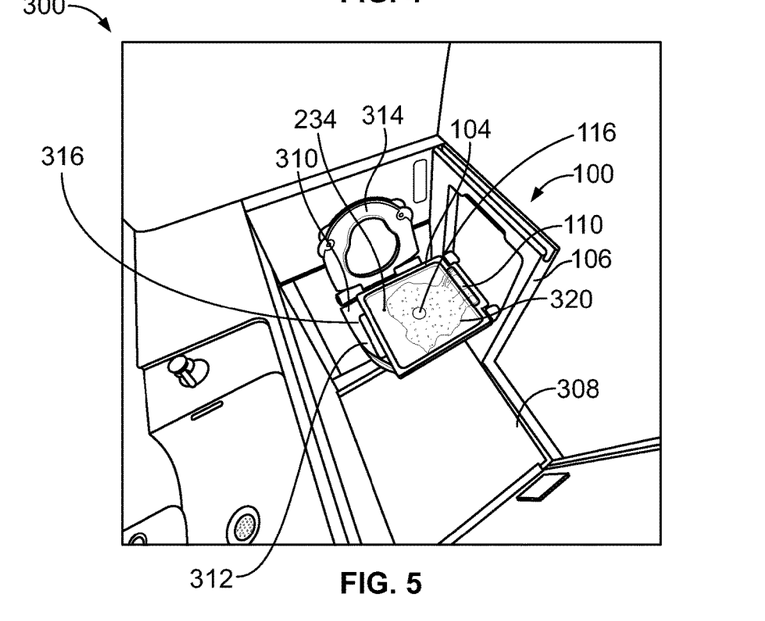
FIG. 5 illustrates a perspective interior view of the lavatory shown in FIG. 4 including the foot washing system having the basin in a deployed position.

FIG. 5 illustrates a perspective interior view of the lavatory 300 including the foot washing system 100 having the basin 104 in the deployed position. A seat 314 of the toilet 310 is in an upright position, thereby exposing the bowl 312. An upper rim 316 of the bowl 312 may support the basin 104. For example, the lower base 216 (shown in FIGS. 2 and 4) of the basin 104 may rest on the upper rim 316, while the drain 116 is positioned directly over a water container of the bowl 312, thereby allowing water 320 delivered from the faucet 110 to drain out of the drain 116 and into the water container of the bowl 312.

The foot washing system 100 is positioned at a height at which the basin 104 in the deployed position is directly over the bowl 312, and may be directly supported by the upper rim 316. In this manner, the bowl 312 may directly support the basin 104 in the deployed position and thereby reduce a possibility that the basin 104 may extend past the deployed position or otherwise break from the support panel 106. Optionally, the basin 104 in the deployed position may be spaced apart from the upper rim 316.

In the deployed position, the upper surface 234 of the base 216 of the basin 104 may be parallel with the surface of the floor 308. For example, in the deployed position, the basin 104 may be horizontal in relation to the floor 308 to reduce the possibility that the water 320 flows over the periphery of the basin 104. The upper surface 234 may be slightly sloped towards the drain 116 in order to direct water towards the drain 116.

Alternatively, in at least one other embodiment, the foot washing system 100 may be positioned within the lavatory 300 so that the basin 104 does not extend over the bowl 312 in the deployed position. In this embodiment, the drain 116 of the basin 104 is fluidly connected to the waste water container 118 through the drainage conduit 120, as shown in FIG. 1. Further, the basin 104 may include deployable legs that are pivotally connected to the base 216 (such as to a lower surface, lateral edges, or the like) that may be downwardly pivoted in the deployed position to brace the basin 104 in relation to the floor 308.

Figure 6:
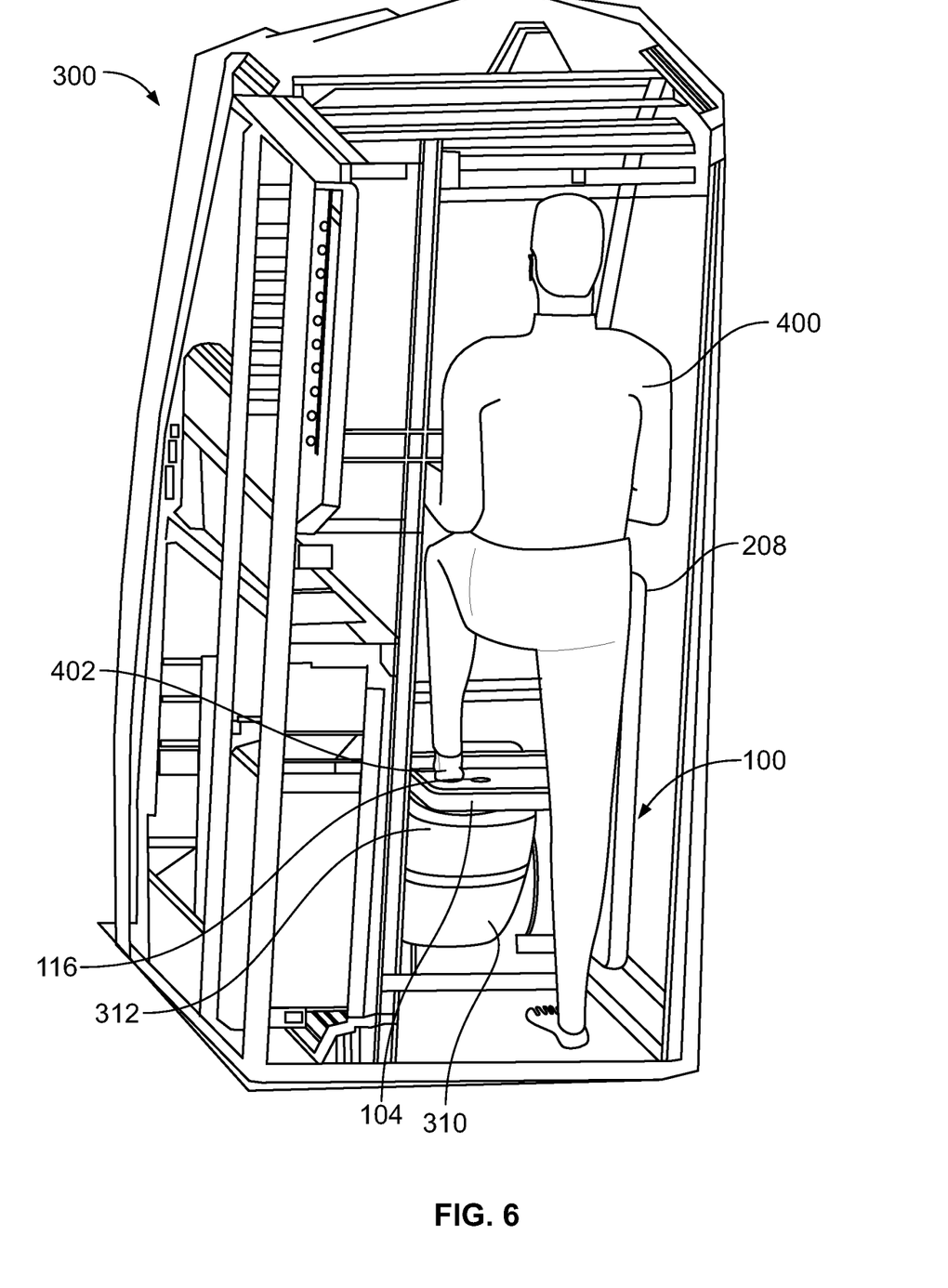
FIG. 6 illustrates a perspective interior view of a lavatory including a foot washing system having a basin in a deployed position, according to an example of the present disclosure.

FIG. 6 illustrates a perspective interior view of a lavatory 300 including the foot washing system 100 having the basin 104 in the deployed position, according to an example of the present disclosure. The basin 104 is supported over the toilet 310. An individual 400 places a foot 402 within the basin 104, and may grasp the top support handle 208 for support and stability.

The foot washing system 100 is positioned within an enclosed space, such as the lavatory 300, so that the basin 104 in the deployed position allows the individual 400 to easily position a foot 402 within the basin 104. For example, the basin 104 may be positioned on and directly above the bowl 312 of the toilet 310.

Figure 7:
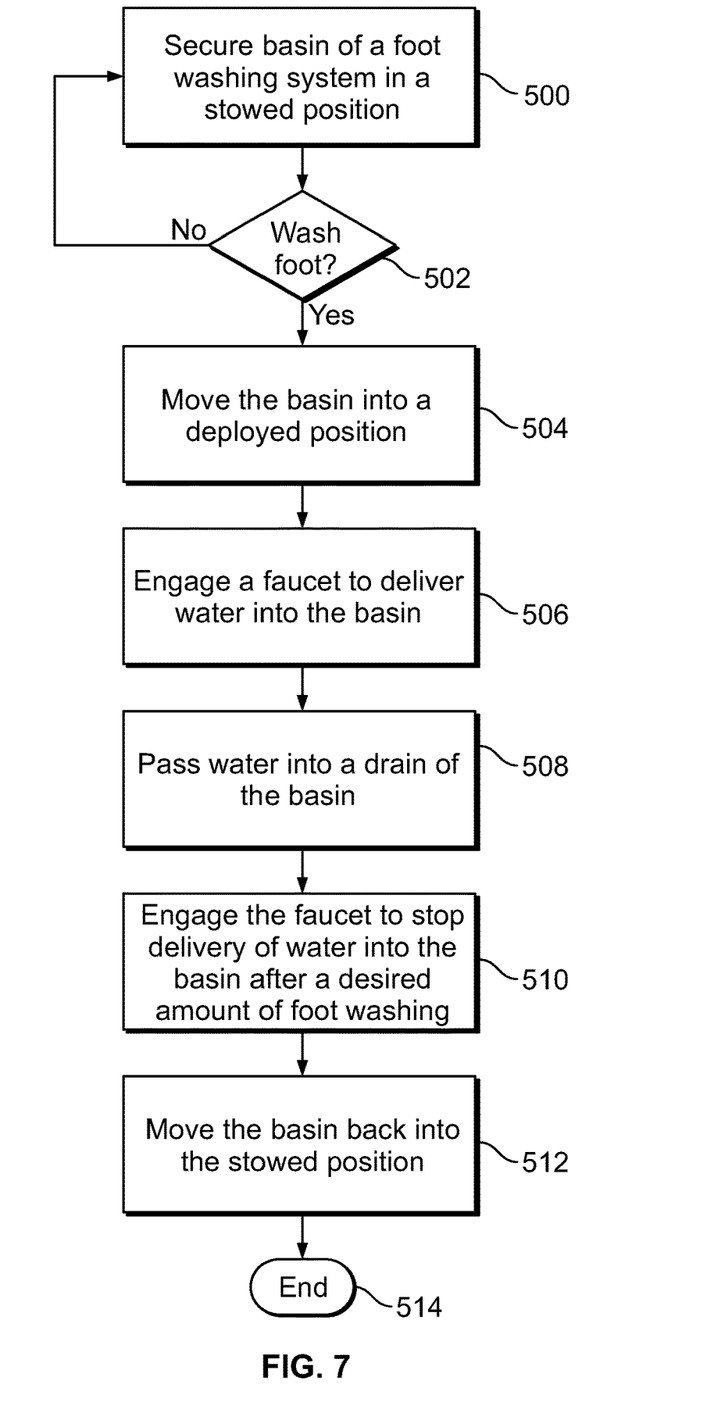
FIG. 7 illustrates a flow chart of a foot washing method within an enclosed space, according to an embodiment of the present disclosure.

FIG. 7 illustrates a flow chart of a foot washing method within an enclosed space, according to an embodiment of the present disclosure. Referring to FIGS. 1 and 7, the method begins at 500, at which the basin 104 of the foot washing system 100 is secured in a stowed position. At 502, an individual decides whether to wash a foot or not. If not, the method returns to 500, at which the basin 104 is maintained in the stowed position.

If the individual desires a foot wash at 502, the method proceeds to 504, at which the individual moves the basin 104 into a deployed position. At 506, the individual then engages the faucet 110 to deliver water into the basin 104. In at least one embodiment, the faucet 110 may be configured to automatically deliver water into the basin 104 when the basin 104 is in the deployed position. At 508, the water is passed into and out of the drain 116 of the basin.

At 510, the individual may engage the faucet 110 to stop delivery of the water into the basin 104 after a desired amount of foot washing. In a least one embodiment, the faucet 110 may be configured to automatically cease delivery of water into the basin 104 in response to the basin 104 being moved towards the stowed position. At 512, the basin 104 is moved back into the stowed position. The method ends at 514.

Figure 8:
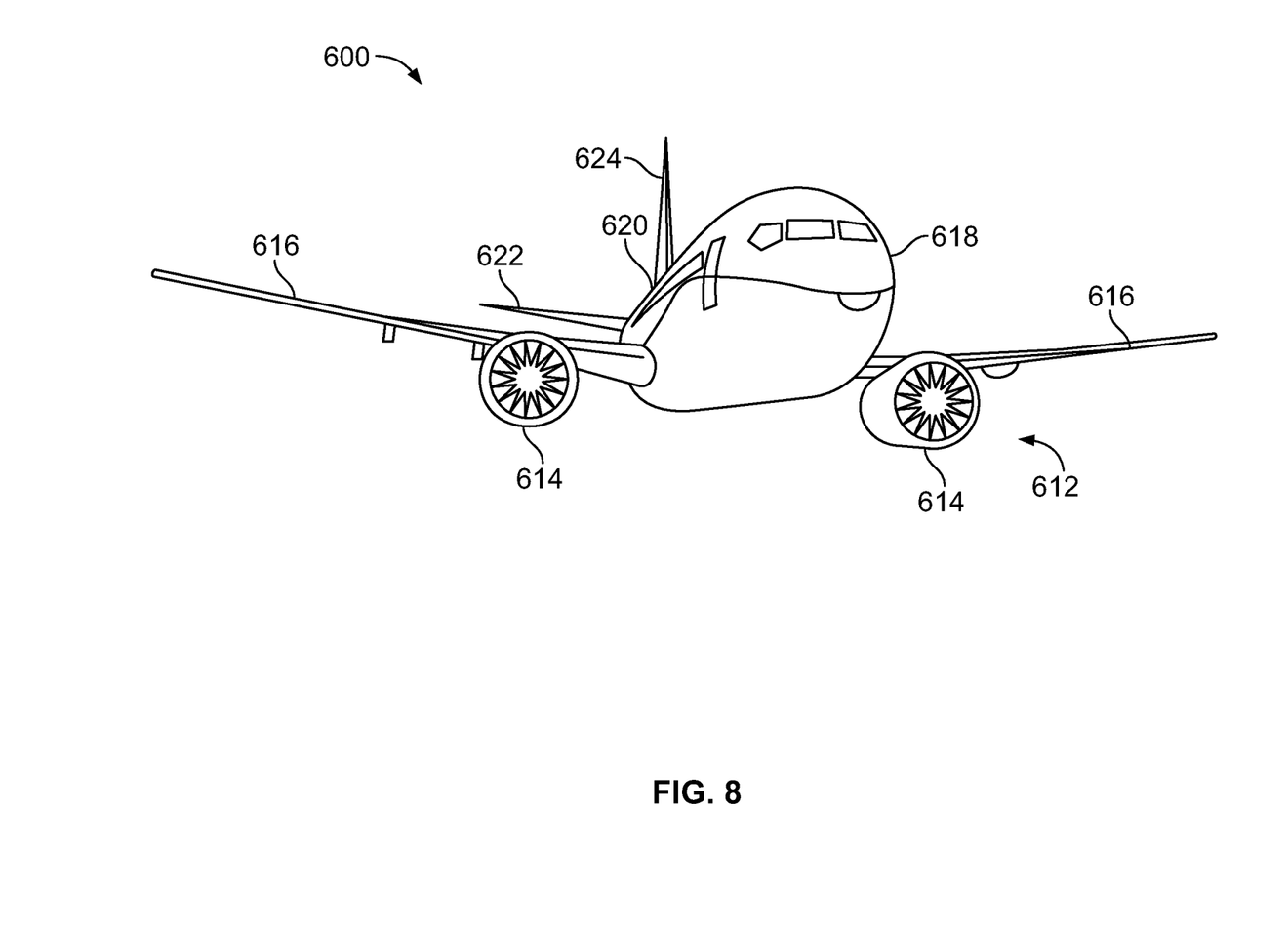
FIG. 8 illustrates a perspective front view of an aircraft, according to an example of the present disclosure.

FIG. 8 illustrates a perspective front view of an aircraft 610, according to an example of the present disclosure. The aircraft 610 includes a propulsion system 612 that may include two turbofan engines 614, for example. Optionally, the propulsion system 612 may include more engines 614 than shown. The engines 614 are carried by wings 616 of the aircraft 610. In other embodiments, the engines 614 may be carried by a fuselage 618 and/or an empennage 620. The empennage 620 may also support horizontal stabilizers 622 and a vertical stabilizer 624.

The fuselage 618 of the aircraft 610 defines an internal cabin, which includes a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class/section divider assemblies, as described herein. The aircraft 610 includes one or more foot washing systems 100 (shown in FIGS. 1-6) within the internal cabin, such as within one or more lavatories.

Alternatively, instead of an aircraft, embodiments of the present disclosure may be used with various other vehicles, such as automobiles, buses, locomotives and train cars, seacraft, spacecraft, and the like.

Figure 9A:
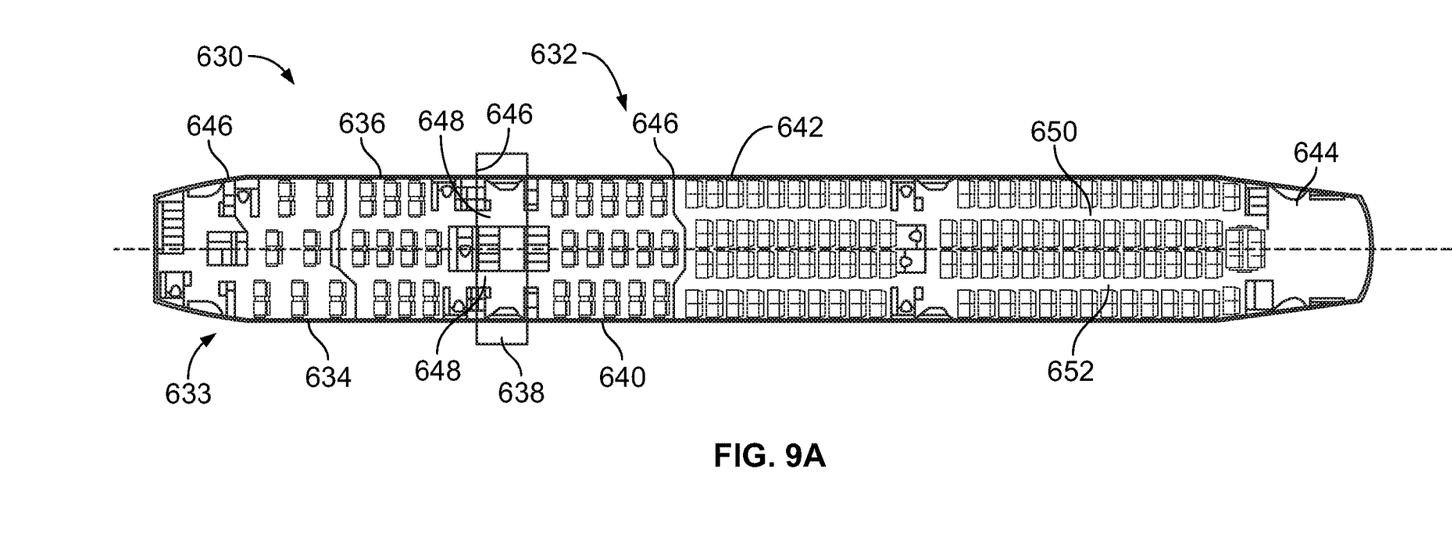
FIG. 9A illustrates a top plan view of an internal cabin of an aircraft, according to an example of the present disclosure.

FIG. 9A illustrates a top plan view of an internal cabin 630 of an aircraft, according to an example of the present disclosure. One or more foot washing systems 100 (shown in FIGS. 1-6) are within the internal cabin 630, such as within one or more lavatories. The internal cabin 630 may be within a fuselage 632 of the aircraft 610, shown in FIG. 8. For example, one or more fuselage walls may define the internal cabin 630. The internal cabin 630 includes multiple sections, including a front section 633, a first class section 634, a business class section 636, a front galley station 638, an expanded economy or coach section 640, a standard economy or coach section 642, and an aft section 644, which may include multiple lavatories and galley stations. It is to be understood that the internal cabin 630 may include more or less sections than shown. For example, the internal cabin 630 may not include a first class section, and may include more or less galley stations than shown. Each of the sections may be separated by a cabin transition area 646, which may include class/section divider assemblies between aisles 648.

As shown in FIG. 9A, the internal cabin 630 includes two aisles 650 and 652 that lead to the aft section 644. Optionally, the internal cabin 630 may have less or more aisles than shown. For example, the internal cabin 630 may include a single aisle that extends through the center of the internal cabin 630 that leads to the aft section 644.

Figure 9B:
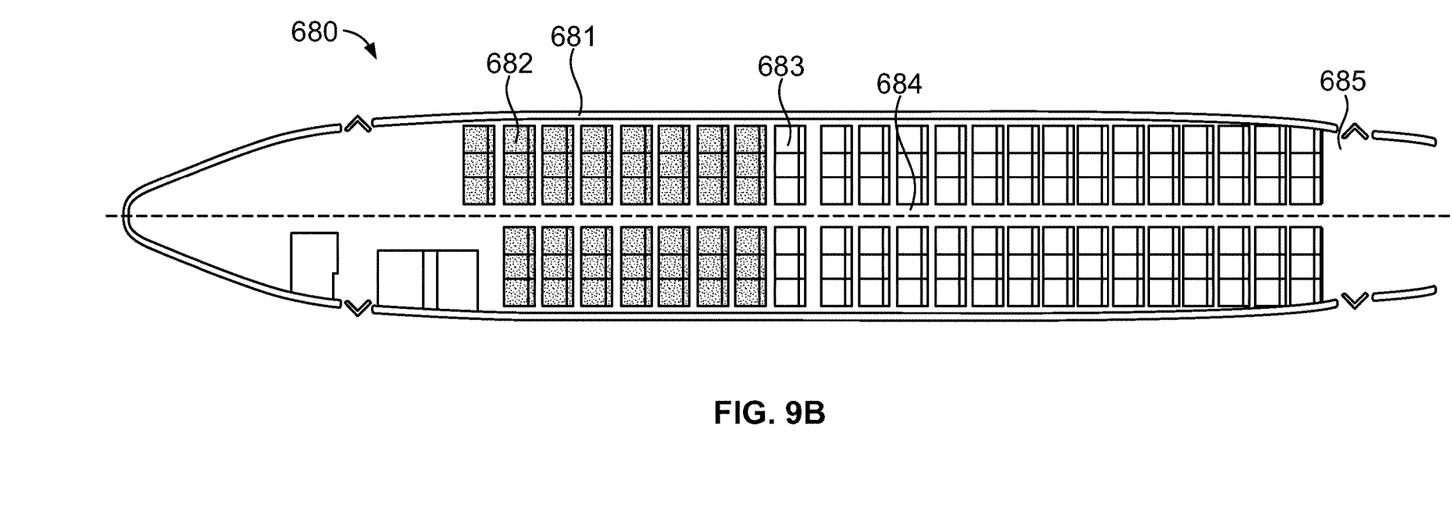
FIG. 9B illustrates a top plan view of an internal cabin of an aircraft, according to an example of the present disclosure.

FIG. 9B illustrates a top plan view of an internal cabin 680 of an aircraft, according to an example of the present disclosure. One or more foot washing systems 100 (shown in FIGS. 1-6) are within the internal cabin 680, such as within one or more lavatories. The internal cabin 680 may be within a fuselage 681 of the aircraft 610, shown in FIG. 8. For example, one or more fuselage walls may define the internal cabin 680. The internal cabin 680 includes multiple sections, including a main cabin 682 having passenger seats 683, and an aft section 685 behind the main cabin 682. It is to be understood that the internal cabin 680 may include more or less sections than shown.

The internal cabin 680 may include a single aisle 684 that leads to the aft section 685. The single aisle 684 may extend through the center of the internal cabin 680 that leads to the aft section 685. For example, the single aisle 684 may be coaxially aligned with a central longitudinal plane of the internal cabin 680.

Referring to FIGS. 1-9B, as described herein, embodiments of the present disclosure provide systems and methods that allow individuals within a confined space, such as that of an aircraft lavatory, to wash their feet. Further, embodiments of the present disclosure provide safe and efficient foot washing systems and methods, particularly within lavatories, such as onboard a commercial aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A foot washing system comprising:
   a support panel including a faucet; and
   a basin including a foot-washing area, a drain configured to drain water out of the foot-washing area, and a drain cover that is configured to cover the drain when the basin is in the stowed position, wherein the drain cover is moveably secured within a recessed track formed in a base of the basin, wherein the basin is moveably coupled to the support panel, wherein the basin is selectively moveable between a stowed position and a deployed position in relation to the support panel, wherein the deployed position allows for foot washing within the foot-washing area, and
   wherein the faucet is configured to deliver water into the foot-washing area of the basin in the deployed position.

2. The foot washing system of claim 1, wherein the basin is pivotally coupled to the support panel.

3. The foot washing system of claim 1, wherein a base of the basin in the stowed position is parallel with an outer lateral surface of the support panel, and wherein the base of the basin in the deployed position is perpendicular to the outer lateral surface of the support panel.

4. The foot washing system of claim 1, further comprising a securing handle that securely retains the basin in the stowed position, wherein the securing handle is configured to be engaged to release the basin from the stowed position.

5. The foot washing system of claim 1, wherein the drain of the basin in the deployed position is configured to be positioned directly over a bowl of a toilet, and wherein the basin is positioned away from the toilet in the stowed position.

6. The foot washing system of claim 5, wherein the basin in the deployed position is configured to be directly supported by the bowl of the toilet.

7. The foot washing system of claim 1, wherein the support panel comprises a graspable top support handle that is configured to be grasped by an individual for support and stability.

8. The foot washing system of claim 1, wherein the basin further comprises at least one additional drain, wherein the at least one additional drain is configured to drain residual water in the basin as the basin is moved from the deployed position into the stowed position.

9. The foot washing system of claim 1, wherein the support panel is configured to be secured to a wall of a lavatory.

10. A foot washing method comprising:
    moveably coupling a basin including a foot-washing area, a drain configured to drain water out of the foot-washing area to a support panel, and a drain cover, wherein the moveably coupling comprises moveably securing the drain cover within a recessed track formed in a base of the basin;
    selectively moving the basin between a stowed position and a deployed position in relation to the support panel, wherein the deployed position allows for foot washing within the foot-washing area;
    covering the drain of the basin with the drain cover of the basin when the basin is in the stowed position; and
    using a faucet of the support panel to deliver water into the foot-washing area of the basin in the deployed position.

11. The foot washing method of claim 10, further comprising:
    positioning a base of the basin in the stowed position to be parallel with an outer lateral surface of the support panel; and
    positioning the base of the basin in the deployed position to be perpendicular to the outer lateral surface of the support panel.

12. The foot washing method of claim 10, further comprising:
    securely retaining the basin in the stowed position with a securing handle; and
    engaging the securing handle to release the basin from the stowed position.

13. The foot washing method of claim 10, further comprising:
    positioning the drain of the basin in the deployed position directly over a bowl of a toilet, and positioning the basin away from the toilet in the stowed position.

14. The foot washing method of claim 13, further comprising directly supporting the basin in the deployed position with the bowl of the toilet.

15. The foot washing method of claim 10, further comprising providing the support panel with a graspable top support handle that is configured to be grasped by an individual for support and stability.

16. The foot washing method of claim 10, further comprising securing the support panel to a wall of a lavatory.

17. A vehicle comprising:
    an internal cabin;
    a lavatory within the internal cabin, wherein the lavatory includes a toilet having a bowl; and
    a foot washing system within the lavatory, wherein the foot washing system comprises:
      a support panel including a faucet, and a graspable top support handle that is configured to be grasped by an individual for support and stability, wherein the support panel is secured to a wall of the lavatory;

a basin including a foot-washing area, a drain configured to drain water out of the foot-washing area, and a drain cover configured to cover the drain when the basin is in a stowed position, wherein the drain cover is moveably secured within a recessed track formed in a base of the basin, wherein the basin is pivotally coupled to the support panel, wherein the basin is selectively moveable between the stowed position and a deployed position in relation to the support panel, wherein the deployed position allows for foot washing within the foot-washing area, wherein a base of the basin in the stowed position is parallel with an outer lateral surface of the support panel, and wherein the base of the basin in the deployed position is perpendicular to the outer lateral surface of the support panel, wherein the drain of the basin in the deployed position is configured to be positioned directly over the bowl of the toilet, wherein the basin is positioned away from the toilet in the stowed position, wherein the basin in the deployed position is configured to be directly supported by the bowl of the toilet;

a securing handle that securely retains the basin in the stowed position, wherein the securing handle is configured to be engaged to release the basin from the stowed position; and wherein the faucet is configured to deliver water into the foot-washing area of the basin in the deployed position.

18. The foot washing system of claim 1, wherein the faucet is covered by the basin in the stowed position, and wherein the faucet is exposed when the basin is in the deployed position.

19. The foot washing method of claim 10, further comprising:

covering the faucet with the basin in the stowed position; and exposing the faucet when the basin is in the deployed position.

20. The foot washing system of claim 1, wherein the drain is integrally formed with the basin.

21. The foot washing method of claim 10, wherein the drain is integrally formed with the basin.

22. The vehicle of claim 17, wherein the drain is integrally formed with the basin, and wherein the drain cover is integrally formed with drain.

* * * * *